(12) United States Patent
Fujii (10) Patent No.: US 11,209,455 B2
(45) Date of Patent: Dec. 28, 2021

(54) ACCELERATION DETECTING DEVICE INCLUDING A CIRCUITRY CONFIGURATION HAVING A SET OF CALCULATIONS DURING ONE ROTATION OF A WHEEL ASSEMBLY

(71) Applicant: PACIFIC INDUSTRIAL CO., LTD., Gifu-ken (JP)

(72) Inventor: Keiyu Fujii, Gifu-ken (JP)

(73) Assignee: PACIFIC INDUSTRIAL CO., LTD., Gifu-Ken (JP)

( * ) Notice: Subject to any disclaimer, the term of this patent is extended or adjusted under 35 U.S.C. 154(b) by 93 days.

(21) Appl. No.: 16/612,518

(22) PCT Filed: Nov. 30, 2018

(86) PCT No.: PCT/JP2018/044308
§ 371 (c)(1),
(2) Date: Nov. 11, 2019

(87) PCT Pub. No.: WO2020/110317
PCT Pub. Date: Jun. 4, 2020

(65) Prior Publication Data
US 2020/0300885 A1    Sep. 24, 2020

(51) Int. Cl.
*G01P 15/00* (2006.01)
*B60C 19/00* (2006.01)
*B60C 23/04* (2006.01)

(52) U.S. Cl.
CPC ............. *G01P 15/00* (2013.01); *B60C 19/00* (2013.01); *B60C 23/0488* (2013.01); *B60C 2019/004* (2013.01)

(58) Field of Classification Search
None
See application file for complete search history.

(56) References Cited

U.S. PATENT DOCUMENTS 6,505,515 B1 * 1/2003 Delaporte ............... G01P 15/00
                                                73/714
9,139,053 B2 * 9/2015 Kosugi ............... B60C 23/0489
(Continued)

FOREIGN PATENT DOCUMENTS

CN     106660417 A     5/2017
JP     2009184405 A    8/2009
(Continued)

OTHER PUBLICATIONS

Search Report issued in European Patent Application No. 18917573.0-1010/369448, dated Jul. 30, 2020 (date of completion, Apr. 24, 2020); 7 pages.
(Continued)

*Primary Examiner* — Andre J Allen
*Assistant Examiner* — Jermaine L Jenkins
(74) *Attorney, Agent, or Firm* — Cantor Colburn LLP (57) ABSTRACT

An acceleration detecting device includes a power source, an acceleration sensor, an acquiring section, a rotation period calculating section, and an acquisition period setting section. The acceleration sensor is configured to detect a centrifugal acceleration generated by rotation of a wheel assembly. The acquiring section is configured to acquire a detection value from the acceleration sensor with a predetermined acquisition period, thereby acquiring the detection value from the acceleration sensor each time the wheel assembly rotates a constant angle. The rotation period calculating section is configured to calculate a rotation period of the wheel assembly. The acquisition period setting section sets the acquisition period. The acquisition period setting section is configured to increase a number of times the detection value is acquired from the acceleration sensor per rotation of the wheel assembly as the rotation period calculated by the rotation period calculating section becomes longer.

5 Claims, 6 Drawing Sheets

(56) References Cited

U.S. PATENT DOCUMENTS

| | | | | |
|---|---|---|---|---|
| 9,783,011 | B2* | 10/2017 | Taki | .................... B60C 23/0416 |
| 10,464,380 | B2* | 11/2019 | Araya | .................. B60C 23/0416 |
| 2014/0007683 | A1 | 1/2014 | Guinart et al. | |
| 2014/0167950 | A1 | 6/2014 | Shima et al. | |
| 2015/0142259 | A1* | 5/2015 | Mori | ................... B60C 23/0488 |
| | | | | 701/32.7 |
| 2017/0190224 | A1 | 7/2017 | Araya | |
| 2017/0203620 | A1 | 7/2017 | Ijima et al. | |
| 2017/0259627 | A1 | 9/2017 | Araya et al. | |

FOREIGN PATENT DOCUMENTS

| | | |
|---|---|---|
| JP | 2010536638 A | 12/2010 |
| JP | 2013006473 A | 1/2013 |
| JP | 2013159265 A | 8/2013 |
| JP | 2013159625 A | 8/2013 |
| WO | 2017042910 A1 | 3/2017 |
| WO | 2017042910 A1 | 9/2017 |

OTHER PUBLICATIONS

The First Office Action for Chinese Application No. 201880030735.5 dated Aug. 18, 2021, 16 pages.

* cited by examiner

ACCELERATION DETECTING DEVICE INCLUDING A CIRCUITRY CONFIGURATION HAVING A SET OF CALCULATIONS DURING ONE ROTATION OF A WHEEL ASSEMBLY

TECHNICAL FIELD

The present invention relates to an acceleration detecting device.

BACKGROUND ART

As described in Patent Document 1, a tire condition monitoring apparatus, which monitors the condition of a tire, includes a transmitter provided in a wheel assembly and a receiver that receives transmission data transmitted from the transmitter. The transmitter includes an acceleration sensor, which detects a centrifugal acceleration generated by rotation of the wheel assembly, and a control section, which acquires a detection value from the acceleration sensor. The control section acquires the detection value of the acceleration sensor several times per rotation of the wheel assembly. The control section is capable of identifying the condition of the wheel assembly from the detection value of the acceleration sensor. The condition of the wheel assembly refers to, for example, whether the rotation angle of the wheel assembly has reached a specific angle or whether the wheel assembly is rotating.

PRIOR ART DOCUMENT

Patent Document

Patent Document 1: Japanese Laid-Open Patent Publication No. 2013-159265

SUMMARY OF THE INVENTION

Problems that the Invention is to Solve

When the number of times the detection value is acquired from the acceleration sensor per rotation of the wheel assembly is small, the condition of the wheel assembly may not be properly acquired. The number of times the detection value is acquired from the acceleration sensor per rotation of the wheel assembly may be increased. This configuration, however, increases power consumption and thus potentially shortens the life of the power source.

Accordingly, it is an objective of the present invention to provide an acceleration detecting device that is capable of reducing power consumption.

Means for Solving the Problems

To achieve the foregoing objective and in accordance with a first aspect of the present invention, an acceleration detecting device is provided that includes a power source, an acceleration sensor, an acquiring section, a rotation period calculating section, and an acquisition period setting section. The acceleration sensor is configured to detect a centrifugal acceleration generated by rotation of a wheel assembly. The acquiring section is configured to acquire a detection value from the acceleration sensor with a predetermined acquisition period, thereby acquiring the detection value from the acceleration sensor each time the wheel assembly rotates a constant angle. The rotation period calculating section is configured to calculate a rotation period of the wheel assembly. The acquisition period setting section sets the acquisition period. The acquisition period setting section is configured to increase a number of times the detection value is acquired from the acceleration sensor per rotation of the wheel assembly as the rotation period calculated by the rotation period calculating section becomes longer.

The acquiring section acquires the detection value from the acceleration sensor a large number of times when the rotation period of the wheel assembly is long. On the other hand, the acquiring section acquires the detection value from the acceleration sensor a small number of times when the rotation period of the wheel assembly is short. Therefore, power consumption can be reduced compared to a case in which the number of times the detection value is acquired from the acceleration sensor is made constant regardless of the rotation period of the wheel assembly. In addition, since the number of times the detection value is acquired from the acceleration sensor increases when the rotation period is long, the acceleration detecting device is capable of properly acquiring the condition of the wheel assembly.

The above-described acceleration detecting device may include a specific angle detecting section that is configured to compare at least two detection values that are acquired consecutively by the acquiring section, and detect that the acceleration detecting device is located at a predetermined specific angle from change in fluctuation of the detection values.

This allows for detection of the rotation angle of the wheel assembly reaching the specific angle.

In the above-described acceleration detecting device, the specific angle detecting section may be configured to determine that the acceleration detecting device has passed a lowest position or a highest position in the wheel assembly when the change in fluctuation of the detection value switches from increasing to decreasing or from decreasing to increasing.

This allows for determination that the acceleration detecting device has passed the highest position or the lowest position.

The above-described may be attached to a back face of a tread portion of a tire. The acceleration detecting device may further include a ground contact determining section that is configured to determine that a section of the tread portion in which the acceleration sensor is located has contacted the ground when the detection value of the acceleration sensor has changed from a value greater than or equal to a predetermined ground contact determination threshold to a value less than the ground contact determination threshold.

This allows for proper determination that the part of the tread portion at which the acceleration sensor is located has contacted the ground.

Effects of the Invention

The present invention is capable of reducing power consumption.

MODES FOR CARRYING OUT THE INVENTION

An acceleration detecting device according to an embodiment will now be described.

Figure 1:
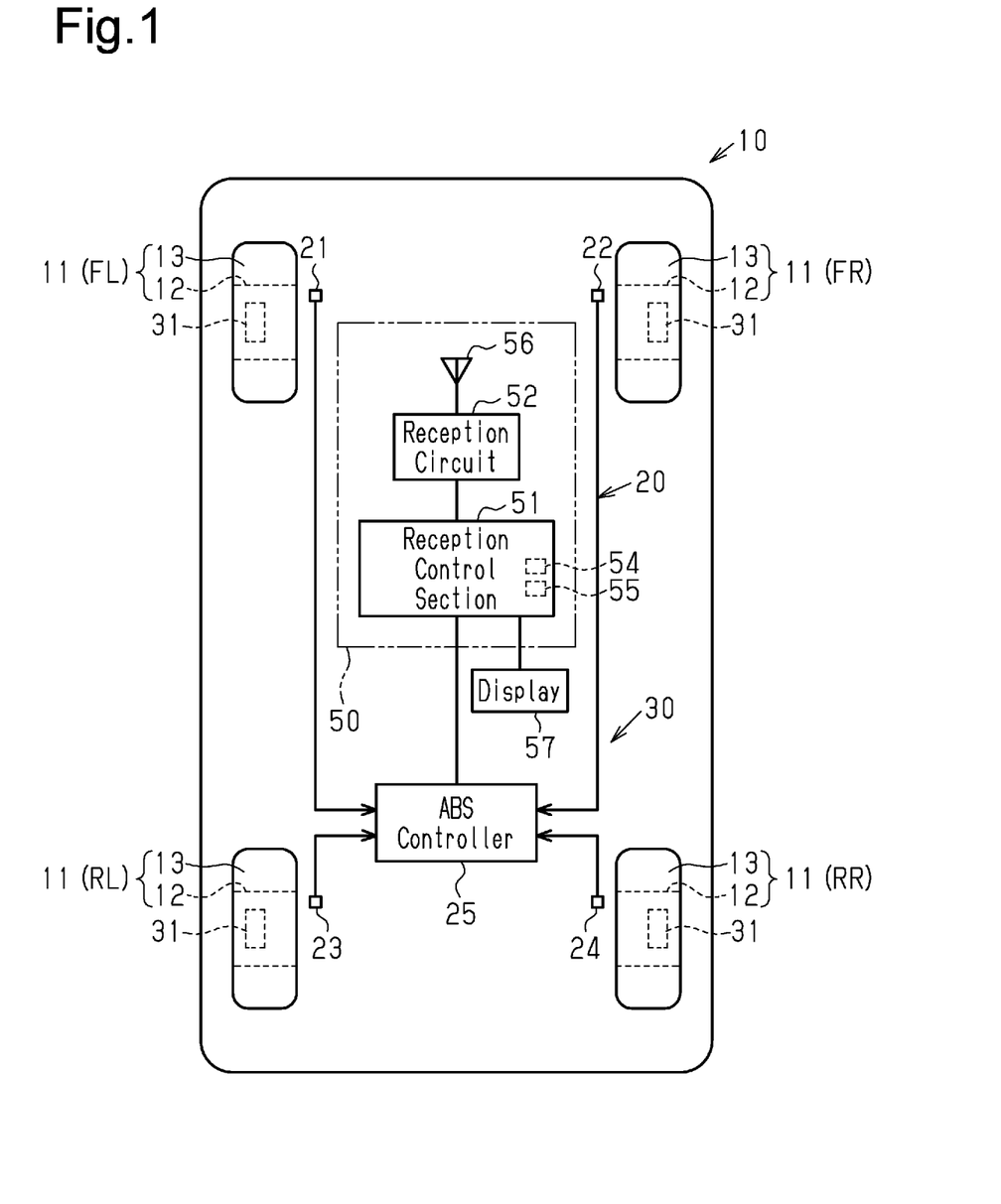
FIG. 1 is a schematic diagram showing the configuration of a tire condition monitoring system.

As shown in FIG. 1, a tire condition monitoring system 30 is mounted on a vehicle 10.

The vehicle 10 includes four wheel assemblies 11. Each of the wheel assemblies 11 includes a wheel 12 and a tire 13 attached to the wheel 12. The wheel assembly 11 on the right front side will be denoted by FR, the wheel assembly 11 at the left front side will be denoted by FL, the wheel assembly 11 at the right rear side will be denoted by RR, and the wheel assembly 11 at the left rear side will be denoted by RL.

The vehicle 10 includes an antilock braking system (ABS) 20. The ABS 20 includes an ABS controller 25 and rotation sensors 21 to 24, which respectively correspond to the four wheel assemblies 11. The first rotation sensor unit 21 corresponds to the left front wheel assembly FL, and the second rotation sensor unit 22 corresponds to the right front wheel assembly FR. The third rotation sensor unit 23 corresponds to the left rear wheel assembly RL, and the fourth rotation sensor unit 24 corresponds to the right rear wheel assembly RR. The ABS controller 25 is configured by a microcomputer and the like and acquires the rotation angle of each of the wheel assemblies 11 based on signals from the rotation sensor units 21 to 24.

Figure 2:
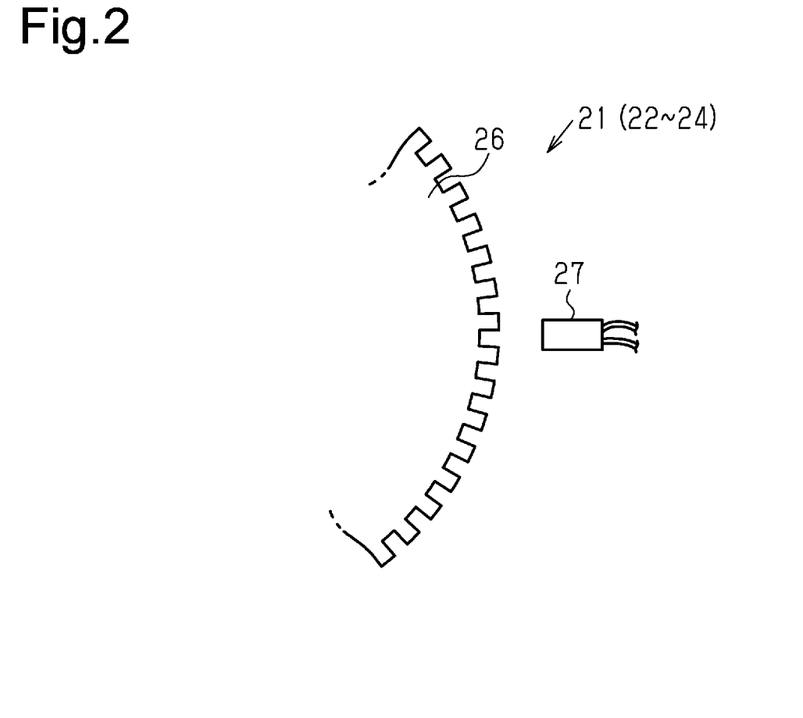
FIG. 2 is a schematic diagram showing the configuration of a rotation sensor unit.

As shown in FIG. 2, each of the rotation sensor units 21 to 24 includes a gear 26, which rotates integrally with the wheel assembly 11, and a detector 27, which is arranged to face the outer circumferential surface of the gear 26. The gear 26 has teeth arranged on the outer circumferential surface at constant angular intervals. The gear 26 has forty-eight teeth. The detector 27 detects pulses generated when the gear 26 is rotated. The ABS controller 25 is connected to the detector 27 by wire and obtains the rotation angle of each of the wheel assemblies 11 based on a pulse count value, which is a detection value of each of the detectors 27. Specifically, the ABS controller 25 counts rising edges and falling edges of the pulses generated in the detector 27. The ABS controller 25 calculates, as the pulse count value, the remainder when the counted number of pulses is divided by the number of pulses per rotation of the gear 26 (ninety-six). Also, the degree of rotation of the gear 26 per pulse count is obtained by dividing 360 degrees by the number of pulses generated by the detector 27 while the wheel assembly 11 rotates one rotation. In this manner, the rotation angle of the wheel assembly 11 is obtained from the pulse count value. The pulse count value is from 0 to 95.

The tire condition monitoring system 30 will now be described.

As shown in FIG. 1, the tire condition monitoring system 30 includes transmitters 31 and a receiver 50. Each transmitter 31 is attached to one of the four wheel assemblies 11. The receiver 50 is installed in the vehicle 10. The transmitter 31 is attached to the wheel assembly 11 so as to be arranged in the inner space of the tire 13. The transmitter 31 is of a type that is fixed to the tire valve, the wheel 12, or the tire 13. The transmitter 31 detects the condition of the corresponding tire 13 and wirelessly transmits transmission data including detected information of the tire 13 to the receiver 50. The tire condition monitoring system 30 monitors the condition of the tire 13 by receiving the transmission data transmitted from the transmitter 31 through the receiver 50.

Figure 3:
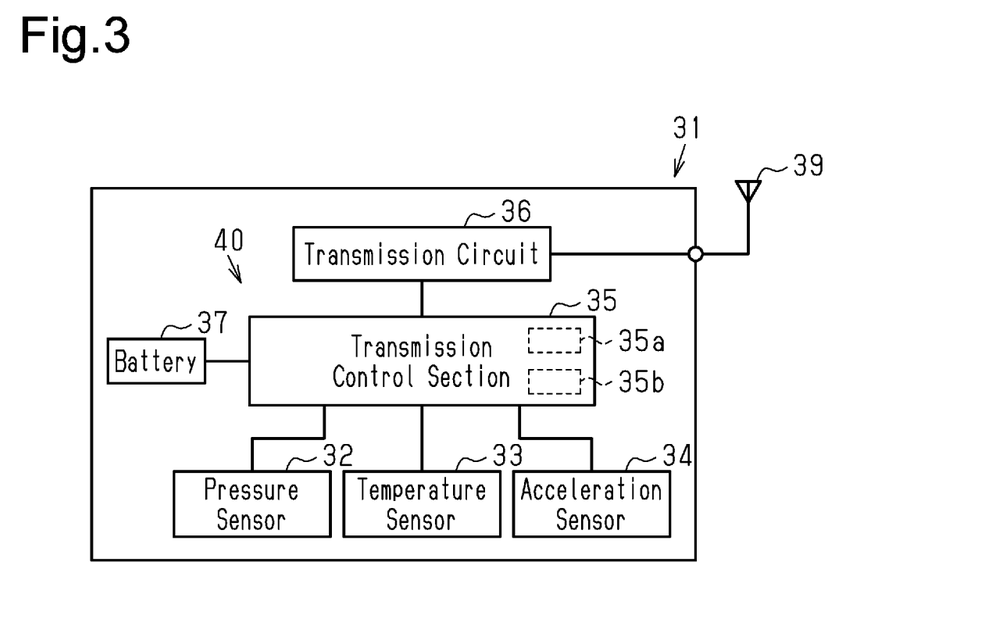
FIG. 3 is a schematic diagram of a transmitter.

As shown in FIG. 3, each of the transmitters 31 includes a pressure sensor 32, a temperature sensor 33, an acceleration sensor 34, a transmission control section 35, a transmission circuit 36, a battery 37, and a transmission antenna 39. The transmitter 31 is driven by power supplied from the battery 37, and the transmission control section 35 controls operation of the transmitter 31 in an integrated manner. The battery 37, which is the power source of the transmitter 31, may be a primary battery or a power storage device such as a rechargeable battery or a capacitor.

The pressure sensor 32 detects the air pressure of the corresponding tire 13. The temperature sensor 33 detects the temperature inside the corresponding tire 13.

The acceleration sensor 34 is installed so as to detect the centrifugal acceleration. The acceleration sensor 34 has a detection axis and detects acceleration in the direction along the detection axis. The acceleration sensor 34 is attached to the wheel assembly 11 such that the detection axis is directed in the vertical direction when the transmitter 31 is located at the lowest position of the wheel assembly 11. The acceleration sensor 34 may be a uniaxial acceleration sensor 34 or a multiaxial acceleration sensor 34 as long as it is capable of detecting at least the centrifugal acceleration.

The transmission control section 35 is configured by a microcomputer or the like including a CPU 35a and a storage section 35b, which includes a RAM, a ROM, and the like. The transmission control section 35 includes a timing function. The timing function is implemented by, for example, a timer or a counter. The transmission control section 35 may include dedicated hardware (application specific integrated circuit: ASIC) that executes at least part of various processes. That is, the transmission control section 35 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memories, or computer readable media, include any type of media that are accessible by general-purpose computers and dedicated computers.

The storage section 35b stores an ID code indicating individual identification information of each of the transmitters 31. For the illustrative purposes, the ID code of the transmitter 31 attached to the left front wheel assembly FL is denoted by FLID, the ID code of the transmitter 31 attached to the right front wheel assembly FR is denoted by FRID, the ID code of the transmitter 31 attached to the left rear wheel assembly RL is denoted by RLID, and the ID code of the transmitter 31 attached to the right rear wheel assembly RR is denoted by RRID. The storage section 35b stores various programs for controlling the transmitter 31.

The transmission control section 35 generates transmission data and outputs the generated transmission data to the transmission circuit 36. The transmission data is digital data and is a data string of binary numbers. The transmission circuit 36 modulates the transmission data. The modulated transmission data is transmitted from the transmission antenna 39 as a wireless signal. The wireless signal is a signal including the transmission data. The wireless signal is transmitted as a signal of an RF band, for example, a 315 MHz band or a 434 MHz band.

The transmitter 31 is capable of executing normal transmission, by which the transmission data is transmitted regardless of the rotation angle of the wheel assembly 11, and specific angle transmission, by which the transmission data is transmitted when the rotation angle of the wheel assembly 11 is a predetermined specific angle.

In the normal transmission, the transmission data is transmitted from the transmitter 31 at a predetermined interval. The predetermined interval is set to, for example, ten seconds to several tens of seconds.

The specific angle transmission is performed, for example, when the vehicle 10 has been in a stopped state continuously for a predetermined time or longer. The predetermined time is set to time longer than time required for changing the positions of the wheel assemblies 11 such as in tire rotations or time required for replacing the wheel assemblies 11. The predetermined time is set to, for example, several tens of minutes to several hours.

Whether the vehicle 10 is traveling can be determined based on the acceleration detected by the acceleration sensor 34. The centrifugal acceleration acting on the acceleration sensor 34 increases as the vehicle speed increases. If the acceleration detected by the acceleration sensor 34 is greater than or equal to a travel determination threshold, the transmission control section 35 determines that the vehicle 10 is traveling. If the acceleration detected by the acceleration sensor 34 is less than the travel determination threshold, the transmission control section 35 determines that the vehicle 10 is in a stopped state. The travel determination threshold is set to a value greater than the acceleration detected by the acceleration sensor 34 when the vehicle 10 is in a stopped state while taking factors such as tolerances into consideration.

In the specific angle transmission, the transmitter 31 transmits the transmission data when the rotation angle of the wheel assembly 11 is detected to be the predetermined specific angle. Specifically, the transmission control section 35 transmits the transmission data from the transmitter 31 when the specific angle is detected and a predetermined time (for example, ten seconds to several tens of seconds) has elapsed since the last transmission of the transmission data.

The process performed by the transmission control section 35 when performing the specific angle transmission will now be described.

Figure 4:
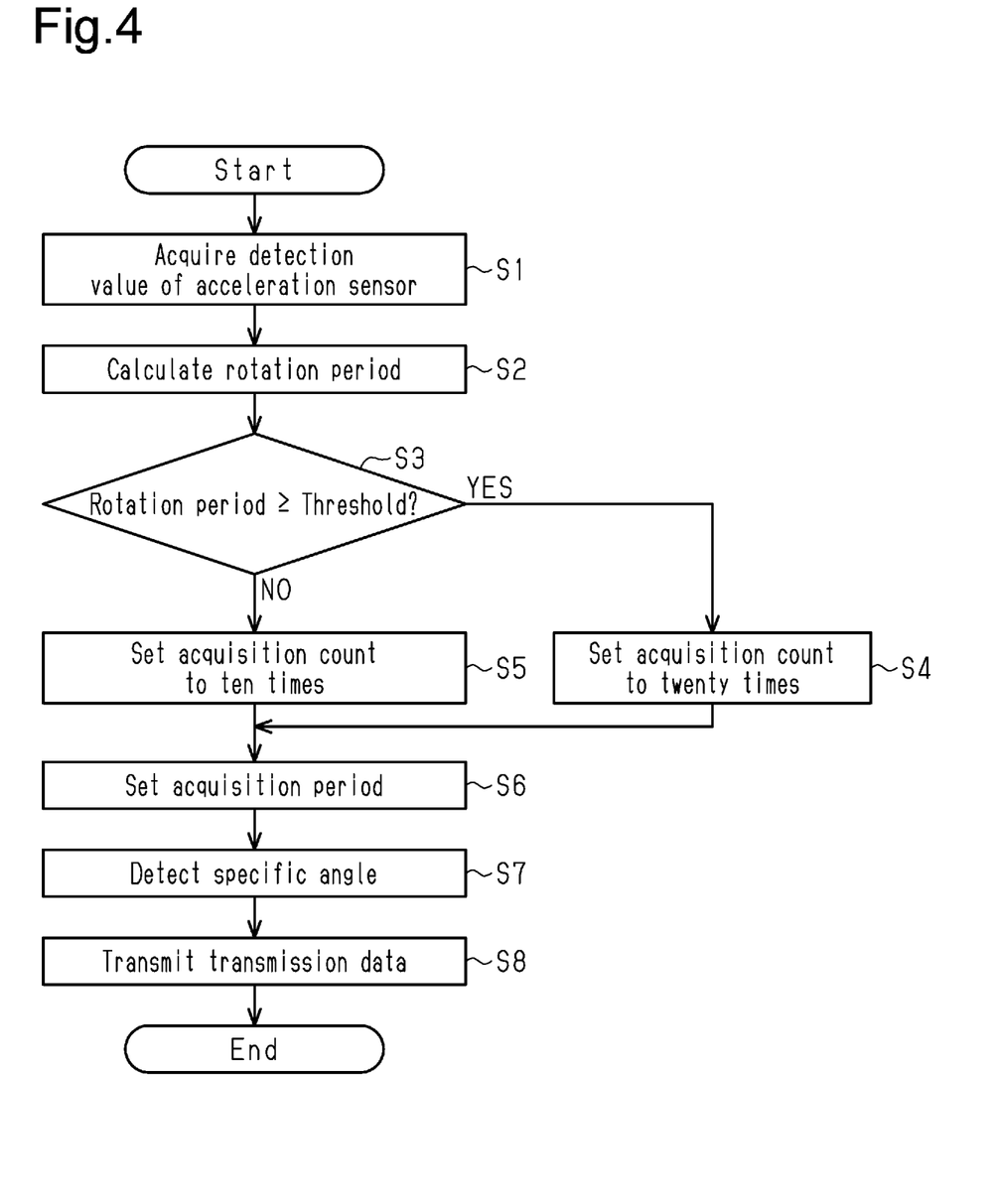
FIG. 4 is a flowchart showing the process performed by a transmission control section when performing a specific angle transmission.

As shown in FIG. 4, the transmission control section 35 acquires the detection value of the acceleration sensor 34 in step S1. The transmission control section 35 functions as an acquiring section. Next, in step S2, the transmission control section 35 calculates the rotation period [seconds] of the wheel assembly 11. Specifically, the transmission control section 35 calculates the rotation period of the wheel assembly 11 by using the following expression (1).

[Expression 1]

$$S = \frac{\sqrt{36 \times R \times 1118 \times 10^{-4}}}{\sqrt{G}} \quad (1)$$

where S represents the rotation period [seconds] of the wheel assembly 11, G represents the detection value [G] of the acceleration sensor 34, and R represents the radius [mm] of the rim or the wheel 12. The radius of the rim of the wheel 12 is stored in the storage section 35b. The transmission control section 35 functions as a rotation period calculating section.

In step S3, the transmission control section 35 determines whether the rotation period is longer than or equal to a threshold. The threshold is used to determine whether the vehicle speed is low or high. The rotation period correlates with the vehicle speed, and the rotation period becomes shorter as the vehicle speed increases. For example, the threshold is set to a value that corresponds to the vehicle speed of 70 [km/h].

If the rotation period is greater than or equal to the threshold, the transmission control section 35 executes the process of step S4. If the rotation period is less than the threshold, the transmission control section 35 executes the process of step S5. In step S4, the transmission control section 35 sets an acquisition count to twenty times. In step S5, the transmission control section 35 sets the acquisition count to ten times. The acquisition count is the number of times the detection value is acquired from the acceleration sensor 34 per rotation of the wheel assembly 11. Thus, it can be said that the transmission control section 35 increases the number of times the detection value is acquired from the acceleration sensor 34 per rotation of the wheel assembly 11 as the rotation period calculated with the expression (1) becomes longer.

The acquisition count, which is set in correspondence with the rotation period, is preferably changed by being multiplied by integers. In the present embodiment, two values of the acquisition count are set in correspondence with the rotation period. Specifically, the acquisition count is set to ten times or twenty times, which is obtained by multiplying ten times by two. If three values of the acquisition count are set in correspondence with the rotation period, the acquisition count is preferably set to ten times, twenty times, or thirty times.

Next, in step S6, the transmission control section 35 calculates an acquisition period, which is a period in which a detection value is acquired from the acceleration sensor 34, from the set acquisition count. The acquisition period is set such that the detection value is acquired the number of times corresponding to the set acquisition count per rotation of the wheel assembly 11. The acquisition period is calculated by dividing the rotation period by the acquisition count. The transmission control section 35 functions as an acquisition period setting section.

Next, in step S7, the transmission control section 35 detects that the rotation angle of the wheel assembly 11 matches the specific angle. First, the transmission control section 35 acquires a detection value from the acceleration sensor 34 with the calculated acquisition period.

Figure 5:
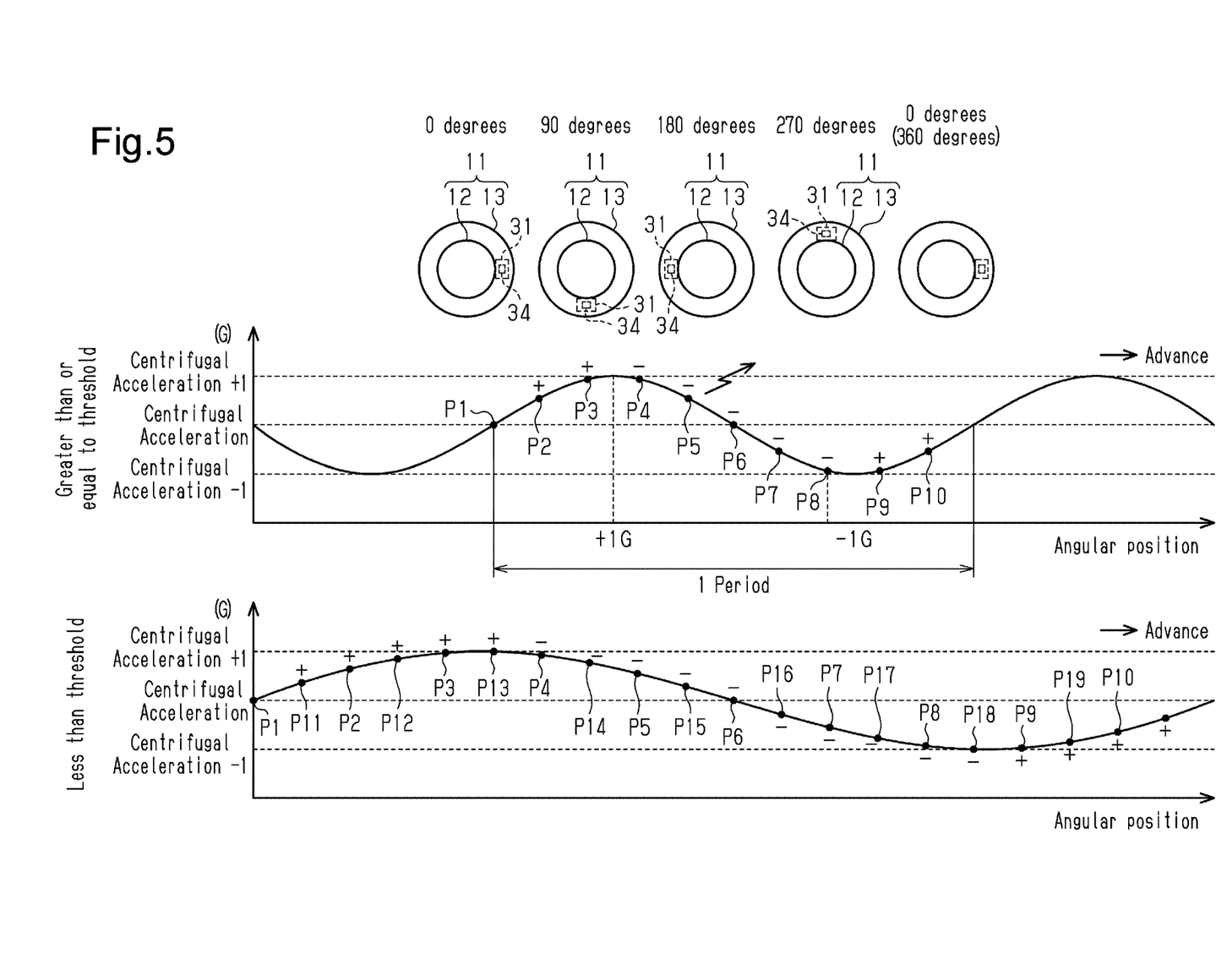
FIG. 5 is a diagram showing the relationship between the rotation period and the acquisition count.

As shown in FIG. 5, the gravitational acceleration always acts in the vertical direction. The detection axis of the acceleration sensor 34 changes its orientation as the wheel assembly 11 rotates. Thus, the gravitational acceleration detected by the acceleration sensor 34 fluctuates depending on the rotation angle of the wheel assembly 11. More specifically, the detection value of the acceleration sensor 34 changes along a sine wave with the centrifugal acceleration being the center. In the present embodiment, the detection value is the centrifugal acceleration+1[G] when the acceleration sensor 34 is located at the lowest position in the wheel assembly 11, and the detection value is the centrifugal acceleration−1[G] when the acceleration sensor 34 is located at the highest position in the wheel assembly 11. For the illustrative purposes, the origin (0°) of the rotation angle of the wheel assembly 11 is set to the angle at which the transmitter 31 is located at the most forward position in the wheel assembly 11. The rotation angle of the wheel assembly 11 when the transmitter 31 is located at the lowest position in the wheel assembly 11 is defined as 90°. The rotation angle of the wheel assembly 11 when the transmitter 31 is located at the rearmost position in the wheel assembly 11 is defined as 180°. The rotation angle of the wheel assembly 11 when the transmitter 31 is located at the highest position in the wheel assembly 11 is defined as 270°. The highest position is the highest position in the vertical direction of the wheel assembly 11, and the lowest position is the lowest position in the vertical direction in the wheel assembly 11.

When the detection value is acquired from the acceleration sensor 34 with the acquisition period, the detection value is acquired each time the wheel assembly 11 rotates by 36° if the acquisition count is ten times. The detection value is acquired each time the wheel assembly 11 rotates by 18° if the acquisition count is twenty times. In correspondence with the acquisition count, the detection value is acquired at constant angular intervals. Thus, for each value of the acquisition count, the angle at which detection value is acquired is a constant angle. For example, when the acquisition count is ten times, the detection value is acquired at constant angular interval of 36°, or at 0°, 36°, 72°, . . . . When the acquisition count is twenty times, the detection value is acquired at constant angular interval of 18°, or at 0°, 18°, 36°, . . . .

FIG. 5 shows acquisition points P1 to P10, which represent points in time at which the detection value is acquired when the acquisition count is ten times. Unless the vehicle 10 is abruptly accelerated or stopped, the vehicle speed scarcely changed significantly during rotation of the wheel assembly 11, and changes in the detection value per rotation of the wheel assembly 11 is assumed to be caused by changes in the position of the acceleration sensor 34. In other words, the rotation angle of the wheel assembly 11 is acquired by monitoring changes in the detection value of the acceleration sensor 34.

The rotation angle of the wheel assembly 11 when the detection value is acquired at the acquisition points P1 to P10 varies in a range between a value obtained by adding, to the rotation angle, half the value obtained by dividing 360° by the acquisition count and a value obtained by subtracting the same value from the rotation angle. Thus, if the acquisition count is ten times, the rotation angle of the wheel assembly 11 when the detection value is acquired at the acquisition points P1 to P10 varies in a range of ±18°. For example, when the rotation angle at which the detection value is acquired at the acquisition points P2 is 36°, the acquisition point P2 varies in a range of 36°±18°. The above-described constant angle is employed to accept this error.

Comparison between the detection value obtained at each of the acquisition points P1 to P10 and the detection value obtained at the last one of the acquisition points P1 to P10 show that the acquisition points P1 to P10 include acquisition points at which the detection value switches from increasing to decreasing and acquisition points at which the detection value switches from decreasing to increasing. In FIG. 5, sign "+" indicates an increase, and sign "−" indicates a decrease. In the present embodiment, the position at which the gravitational acceleration is detected to be the greatest corresponds to the acceleration sensor 34 being located at the lowest position in the wheel assembly 11. Thus, when the acceleration sensor 34 passes the lowest position in the wheel assembly 11, the detection value switches from increasing to decreasing. In contrast, when the acceleration sensor 34 passes the highest position in the wheel assembly 11, the detection value switches from decreasing to increasing. Thus, the position of the acceleration sensor 34 is acquired from change in fluctuation of the detection value.

As shown in FIG. 5, the detection value is acquired at the acquisition points P1 to P20 when the acquisition count is twenty times. For the acquisition points P1 to P10, which are half the acquisition points P1 to P20, the detection value is acquired at the same rotation angles of the acquisition points P1 to P10 in a case in which the acquisition count is ten times. When the acquisition count is twenty times, the rotation angle of the wheel assembly 11 when the detection value is acquired at the acquisition points P1 to P20 varies in a range of ±9°. For example, the rotation angle of the wheel assembly 11 when the detection value is acquired at the acquisition point P2 is within a range of 36°±9°. Each of the acquisition points P11 to P20 is an intermediate angle between an adjacent pair of the acquisition points P1 to P10.

The transmission control section 35 detects that the transmitter 31 is located at the specific angle when the change in fluctuation of at least two detection values that are acquired consecutively has switched from increasing to decreasing. When the acquisition count is ten times, the transmission control section 35 determines that the transmitter 31 is located at the specific angle when the detection value decreases after the change in fluctuation of the detection value switched from increasing to decreasing. That is, the transmission control section 35 determines that the transmitter 31 is located at the specific angle when the change in fluctuation of the detection value is in order of increase, decrease, and decrease.

When the acquisition count is twenty times, the transmission control section 35 determines that the transmitter 31 is located at the specific angle when the change in fluctuation of the detection value is in order of increase, decrease, decrease, and decrease. In the present embodiment, the specific angle is 144°. The specific angle varies in accordance with the acquisition count. Specifically, when the acquisition count is ten times, the specific angle is 144°±18°. When the acquisition count is twenty times, the specific angle is 144°±9°. The transmission control section 35 determines that the transmitter 31 has passed the lowest position in the wheel assembly 11 by detecting the specific angle based on the fact that the change in fluctuation of the detection value switches from increasing to decreasing. The transmission control section 35 functions as a specific angle detecting section.

As shown in FIG. 4, the transmission control section 35 transmits transmission data in step S8 Accordingly, the transmission data is transmitted at the specific angle.

The transmission control section 35 may calculate the rotation period by using an expression obtained by modifying the expression (1) by replacing the numerator of the expression (1) with a value obtained from a table. The storage section of the transmission control section 35 stores a table in which the numerator of the expression (1) is associated with the radius R of the rim of the wheel 12. The transmission control section 35 determines that a calculated rotation period has an error when the set acquisition count is different from the number of times the detection value is actually acquired per rotation of the wheel assembly 11. In such case, the transmission control section 35 changes the value of the numerator of the expression (1). The transmission control section 35 determines that a calculated rotation period is correct when the set acquisition count is equal to the number of times the detection value is actually acquired, and uses the value of the numerator. That is, the rotation period can be calculated even if the radius of the rim of the wheel 12 is not stored in the storage section 35b.

As described above, the transmission control section 35 functions as the acquiring section, the rotation period calculating section, the acquisition period setting section, and the specific angle detecting section. Thus, the battery 37, which is a power source, the acceleration sensor 34, and the transmission control section 35 constitute an acceleration detecting device 40. The transmitter 31 includes the acceleration detecting device 40, which is located at the same position as the transmitter 31.

The receiver 50 will now be described.

As shown in FIG. 1, the receiver 50 includes a reception control section 51, a reception circuit 52, and a reception antenna 56. The reception control section 51 is connected to a display 57 mounted on the vehicle 10. The reception control section 51 is configured by a microcomputer or the like including a reception CPU 54 and a reception storage section 55 (a ROM, a RAM and the like). The reception control section 51 includes a timing function. The timing function is implemented by, for example, a timer or a counter. The reception control section 51 may include dedicated hardware (application specific integrated circuit: ASIC) that executes at least part of various processes. That is, the reception control section 51 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memories, or computer readable media, include any type of media that are accessible by general-purpose computers and dedicated computers.

The reception circuit 52 demodulates the wireless signal received from each of the transmitters 31 via the reception antenna 56 and outputs the transmission data from the transmitters 31 to the reception control section 51.

The reception control section 51 acquires the pressure in the tire 13 and the temperature of the tire 13, which represent the condition of the tire 13, based on the transmission data from the reception circuit 52. When there is an anomaly in the tire 13, the reception control section 51 displays warning on the display 57.

The reception storage section 55 stores the ID codes of the transmitters 31 mounted on the four wheel assemblies 11. With this, the transmitters 31 are associated with the receiver 50.

In some cases, it is desired to determine which one of the four wheel assemblies 11 includes the tire 13 to which the received transmission data corresponds. For example, in some cases, it is desired to display on the display 57 the wheel assembly 11 in which pressure anomaly has occurred in the tire 13 or it is desired to display on the display 57 the pressures of the tires 13 of the respective wheel assemblies 11. In such cases, it is required to determine the received transmission data corresponds to which the wheel assembly 11. In other words, the reception control section 51 needs to associate the ID codes of the respective transmitters 31 with the positions of the wheel assemblies 11.

A wheel assembly position identifying process for identifying one of the four wheel assemblies 11 to which each transmitter 31 is attached will now be described. The wheel assembly position identifying process is performed when the vehicle 10 is activated by a start switch, which switches the state of the vehicle 10 between the activated state and the deactivated state. The activated state of the vehicle 10 refers to a state in the vehicle 10 can travel through operation of the accelerator pedal. The deactivated state of the vehicle 10 refers to a state in which the vehicle 10 will not travel even if the accelerator pedal is operated.

Figure 6:
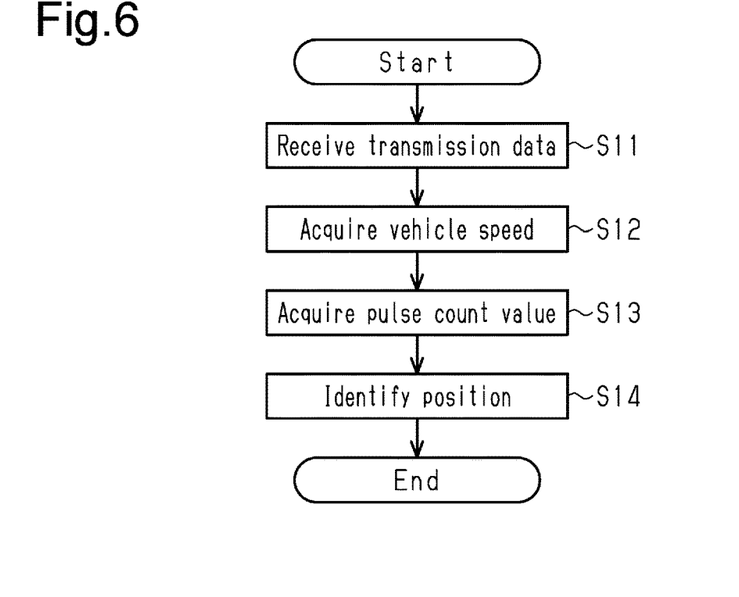
FIG. 6 is a flowchart showing a wheel assembly position identifying process executed by the reception control section.

As shown in FIG. 6, the reception control section 51 transmits transmission data in step S11. Next, the reception control section 51 acquires the vehicle speed from the ABS controller 25. Next, in step S13, the reception control section 51 obtains the pulse count value of each of the rotation sensor units 21 to 24 upon reception of the transmission data. The processes of step S12 and step S13 are executed upon acquisition of the transmission data.

Next, in step S14, the reception control section 51 performs position identification to identify one of the four wheel assemblies 11 to which each of the transmitters 31 is attached. The position identification is performed by collecting pulse count values each time the transmission data is received. The rotation speeds of the wheel assemblies 11 differ, for example, due to the influence of the differential gear. Thus, the relative positions of the transmitters 31 attached to the wheel assemblies 11 change in accordance with travelling of the vehicle 10. Thus, in a case in which the transmitters 31 transmit the transmission data at the specific angle, the rotation angles of the four wheel assemblies 11 is synchronized with the rotation angle at which the transmission data from one of the four transmitters 31 is transmitted. Thus, in a case in which the transmitters 31 transmit the transmission data at the specific angles, when the pulse count value is obtained upon reception of the transmission data, the rotation sensor units 21 to 24 include a rotational sensor unit that has a small variation of the pulse count value in correspondence with each transmitter 31. The reception control section 51 identifies one of the four wheel assemblies 11 to which each of the transmitters 31 is attached based on the variation of the pulse count value collected each time the transmission data is acquired.

When the collected pulse count values fall within a predetermine range, the reception control section 51 associates the rotation sensor unit that detected the pulse count values with the transmitter 31. The predetermined range is set by taking into consideration variations of the pulse count value and is used to determine which one of the rotation sensor units 21 to 24 has small variation in the pulse count values. The reception control section 51 changes the predetermined range in accordance with the vehicle speed. The reception control section 51 sets the predetermined range to be wider when the vehicle speed is greater or equal to a speed threshold than when the vehicle speed is less than the speed threshold. The speed threshold corresponds to the threshold set for the rotation period. In the present embodiment, the threshold set for the rotation period corresponds to the vehicle speed of 70 [km/h], so that the speed threshold is 70 [km/h]. The difference between the predetermined range in a case in which the vehicle speed is less than the speed threshold and the predetermined range in a case in which the vehicle speed is greater than or equal to the speed threshold is, for example, obtained by adding a margin to the pulse count value corresponding to 18°. That is, the predetermined range is set by taking into consideration variation of the specific angle corresponding to the acquisition count.

Figure 7:
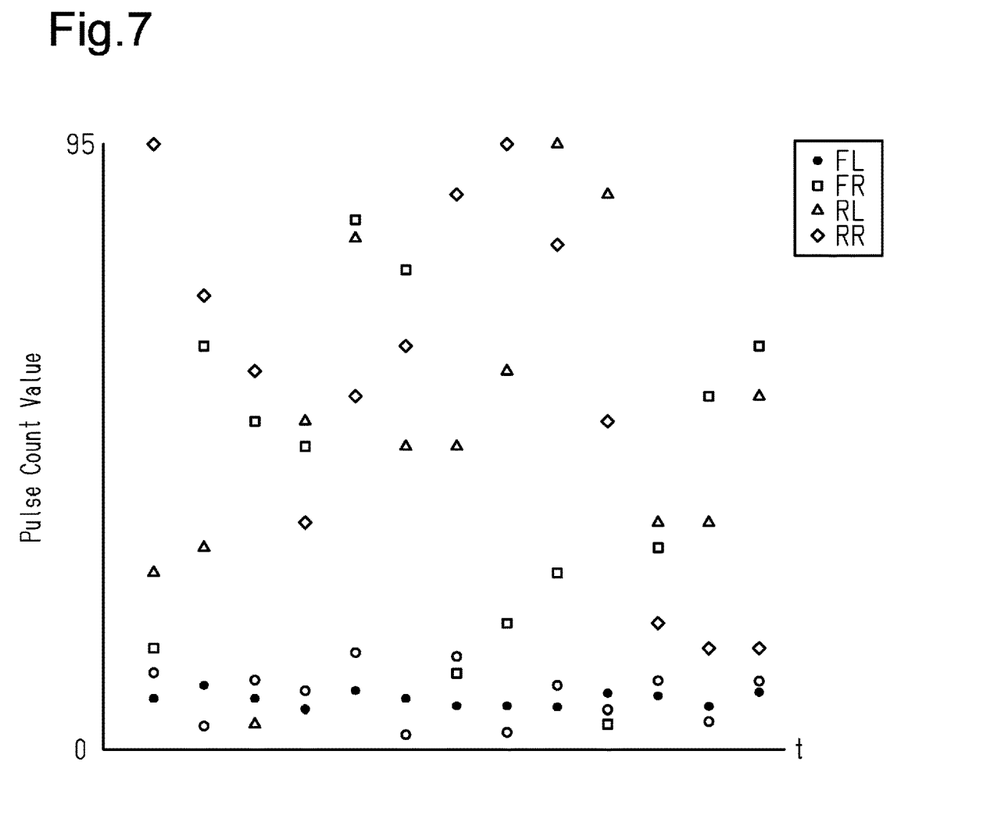
FIG. 7 is a diagram showing an example of the pulse count values acquired upon reception of transmission data transmitted from the transmitter mounted on the left front wheel assembly.

In the example of FIG. 7, the variation of the pulse count value detected by the first rotation sensor unit 21 corresponding to the left front wheel assembly FL is the smallest. Therefore, the transmitter 31 of the FLID can be determined to be attached to the left front wheel assembly FL. In the example shown in FIG. 7, the pulse count values that are detected by the first rotation sensor unit 21 when the acquisition count is ten times are expressed by white circles, and the pulse count values that are detected by the first rotation sensor unit 21 when the acquisition count is twenty times are expressed by black circles. The graph shows that the variation of the pulse count values is small since the variation of the specific angle at which the transmission data is transmitted is small. The reception control section 51 identifies the wheel assemblies 11 to which the transmitters 31 of the FFID, RLID, and RRID are attached. The reception control section 51 associates the four ID codes with the positions of the respective wheel assemblies 11 and stores the relationship in the reception storage section 55. The processes of the steps S11 to S14 are repeated each time the transmission data is received until the correlation between all the transmitters 31 and the wheel assemblies 11 are identified. When the four ID codes are associated with the positions of the wheel assemblies through the process of step S14 the reception control section 51 finishes the wheel assembly position identifying process.

The operation of the present embodiment will now be described.

The transmission control section 35 detects the specific angle from the detection value of the acceleration sensor 34. The transmission control section 35 intermittently acquires the detection value of the acceleration sensor 34 in order to reduce the power consumption of the battery 37. Accordingly, there are period in which the transmission control section 35 cannot acquire detection values.

In the present embodiment, the number of times the detection value is acquired per rotation of the wheel assembly 11 is increased when the specific angle transmission is performed and the rotation period is longer than or equal to the threshold. By increasing the acquisition count of the detection value only when specific conditions are met, the detection accuracy of the specific angle is increased. In the present embodiment, the acquisition count is increased from ten times to twenty times, so that the variation of the specific angle is reduced from ±18° to ±9°. As a result, the reception control section 51 reduces the predetermined range when performing the position identification. This reduces the pulse count values contained in the predetermined range, reducing the time required to identify the wheel assembly 11 to which each transmitter 31 is attached.

The acquisition count may always be increased regardless of the rotation period. However, in this case, the specific angle transmission may be impossible during high speed traveling. Increasing the acquisition count shortens the acquisition period. Further, since the acquisition period is shortened in proportion to the vehicle speed, an increased acquisition count during high sped traveling excessively shorts the acquisition period. When acquiring the detection value from the acceleration sensor 34, the transmission control section 35 requires process time for executing various processes such as comparison between the acquired value and the detection value in the last cycle. If the acquisition period becomes shorter than the process time, the detection value would be acquired before the process is completed, and the process would not be executed properly. In this case, the specific angle transmission would not be performed. That is, the acquisition period needs to be longer than the time obtained by adding a margin to the process time, and the acquisition count cannot be increased regardless of the rotation period. Also, increasing the acquisition count regardless of the rotation period increases the power consumption and thus may reduce the life of the battery 37.

In the present embodiment, the acquisition count is increased when the rotation period is longer than or equal to the threshold. This reduces the time required to identify the wheel assembly 11 to which each transmitter 31 is attached when the rotation period is longer than or equal to the threshold. Particularly, if the threshold for the rotation period is set by taking into consideration the normal use ranges of various countries, remarkable advantages will be achieved.

For example, in Japan, vehicles are predominantly driven at speeds up to 70 [km/h] except for expressways. Thus, the threshold for the rotation period being set to 70 [km/h] allows the advantages of the acceleration detecting device 40 of the present embodiment to be enjoyed in various time periods of the day in which the vehicle 10 is used.

The present embodiment has the following advantages.

(1) The transmission control section 35 increases the number of times the detection value is acquired from the acceleration sensor 34 when the rotation period of the wheel assembly 11 is long. On the other hand, the transmission control section 35 decreases the number of times the detection value is acquired from the acceleration sensor 34 when the rotation period of the wheel assembly 11 is short. Therefore, power consumption can be reduced compared to a case in which the number of times the detection value is acquired from the acceleration sensor 34 is made constant regardless of the rotation period of the wheel assembly 11. In addition, since the number of times the detection value is acquired from the acceleration sensor 34 increases when the rotation period is long, the transmission control section 35 is capable of properly acquiring the condition of the wheel assembly 11.

(2) The transmission control section 35 is capable of detecting that the transmitter 31 is located at the specific angle from the change in fluctuation of the detection value. Being able to cause the transmission data to be transmitted at the specific angle, the transmission control section 35 is capable of causing the receiver to identify the wheel assembly 11 to which each transmitter 31 is attached.

(3) The transmission control section 35 determines that the transmitter 31 is located at the specific angle when the change in fluctuation of the detection value switches from increasing to decreasing. This allows for determination that the transmitter 31 has passed the lowest position.

The present embodiment may be modified as follows. The present embodiment and the following modifications can be combined as long as the combined modifications remain technically consistent with each other.

Figure 8:
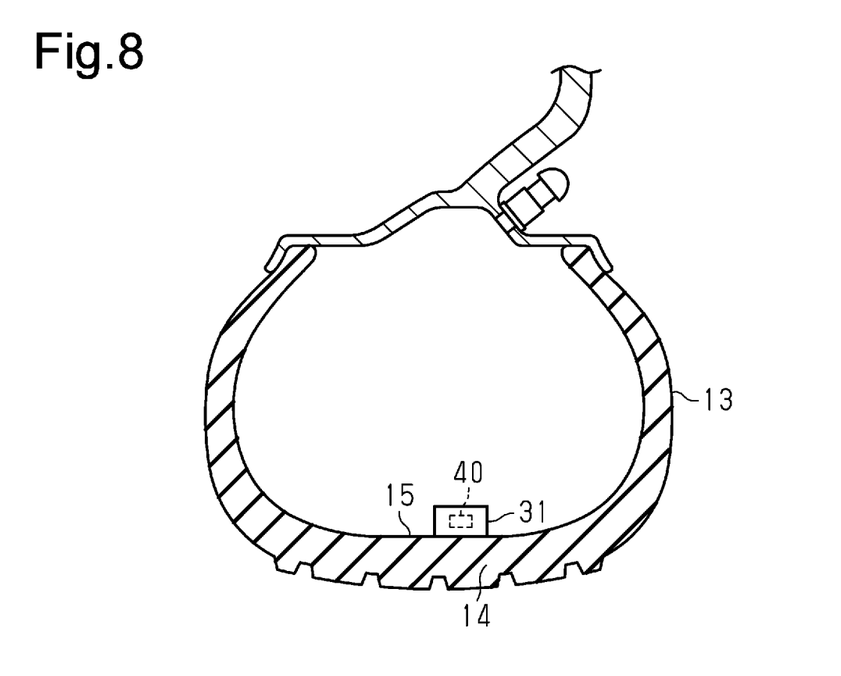
FIG. 8 is a schematic diagram provided in the tread portion of a tire.

The transmission control section 35 may detect whether the part of the tire 13 at which the acceleration sensor 34 is located has contacted the ground from the detection value of the acceleration sensor 34. That is, instead of detecting the specific angle as in the above-illustrated embodiment, the acceleration detecting device 40 may be used to perform ground contact determination. In this case, as shown in FIG. 8, the transmitter 31 is provided on a back face 15 of a tread portion 14 of the tire 13, that is, on the surface opposite to the surface contacting the ground. A part of the tread portion 14 of the tire 13 in which the acceleration sensor 34 is provided is referred to as a sensor mounting section.

During traveling of the vehicle 10, when the sensor mounting section of the tire 13 contacts the ground, the part of the tread portion 14 that is contacting the road surface is crushed, so that the acceleration sensor 34 receives a force in a direction opposite to the direction of the centrifugal acceleration. Thus, the detection value of the acceleration sensor 34 is lowered when the sensor mounting section contacts the road surface. Therefore, the transmission control section 35 is capable of determining that the sensor mounting section of the tread portion 14 of the tire 13 has contacted the ground when the detection value of the acceleration sensor 34 has changed from a value greater than or equal to a predetermined ground contact determination threshold to a value less than the ground contact determination threshold. The ground contact determination threshold is a value greater than the detection value of the acceleration sensor 34 when the vehicle 10 is in a stopped state. The transmission control section 35 functions as a ground contact determining section. Determination that the sensor mounting section has contacted the ground may be made using a change amount of the detection value in addition to the determination using the ground contact determination threshold. When the sensor mounting section contacts ground, the centrifugal acceleration is cancelled, so that the detection value drops significantly. Therefore, it may be determined that the sensor mounting section is contacting the ground when the amount of change of the detection value becomes greater than or equal to a predetermined value.

The above described acceleration detecting device 40 is used in the transmitter 31, which, for example, detects the condition of the road surface. In this type of transmitter 31, the condition of the road surface is estimated from a detection result of a sensor acquired when the sensor mounting section of the tire 13 contacts the ground. Therefore, detection of the sensor mounting section contacting the ground surface is important. The time during which the sensor mounting section contacts the ground is short. Thus, a smaller number of the acquisition count may prevent ground contacting of the sensor mounting section from being detected. However, the acceleration detecting device 40 increases the acquisition count in correspondence with the rotation period of the wheel assembly 11. Therefore, it is possible to determine that the sensor mounting section has contacted the ground, in other words, that the rotation angle of the wheel assembly 11 has reached the angle at which the sensor mounting section contacts the ground.

The transmission control section 35 may determine that the transmitter 31 has reached the specific angle based on the change in fluctuation of the detection value being switched from decreasing to increasing. In this case, the transmission control section 35 is able to determine that the transmitter 31 has passed the highest position in the wheel assembly 11.

The specific angle at which the transmission control section 35 transmits the transmission data may be changed. In this case, the specific angle simply needs to be changed by changing the change in fluctuation of the detection value that triggers the transmission.

Multiple specific angles may be set.

The acquisition count may be changed as necessary.

The acquisition count may be linearly increased as the rotation period is extended, without using the threshold.

The acceleration sensor 34 may be arranged in any manner as long as it is capable of detecting the centrifugal acceleration.

Various types of power generating elements may be used as the power source of the transmitter 31. Even if a member that is capable of being charged or generating power is used as the power source, there is a limit to power that can be used. Therefore, it is preferable to reduce the power consumption by transmission of the transmission data. Thus, by transmitting the transmission data without data indicating the angle information, the limited power is used effectively.

In each embodiment, the vehicle 10 only has to include multiple wheel assemblies 11, and for example, the vehicle 10 may be a motorcycle.

The receiver 50 may be a portable terminal carried by an occupant of the vehicle 10.

DESCRIPTION OF THE REFERENCE NUMERALS

11 . . . Wheel Assembly, 13 . . . Tire, 14 . . . Tread Portion, 15 . . . Back Face, 34 . . . Acceleration Sensor, 35 . . . Transmission Control Section (Acquiring Section, Rotation Period Calculating Section, Acquisition Period Setting Section, and Specific Angle Detecting Section), 37 . . . Battery (Power Source).

The invention claimed is:

1. An acceleration detecting device comprising:
a power source;
an acceleration sensor that is configured to detect a centrifugal acceleration generated by rotation of a wheel assembly; and
circuitry that is configured to:
    acquire a detection value from the acceleration sensor with a predetermined acquisition period, thereby acquiring the detection value from the acceleration sensor each time the wheel assembly rotates a constant angle;
    calculate a rotation period of the wheel assembly;
    set an acquisition count, which is a number of times the detection value is acquired from the acceleration sensor per rotation of the wheel assembly, in correspondence with the rotation period calculated so that the acquisition count is increased as the rotation period becomes longer; and
    calculate the acquisition period by dividing the rotation period by the acquisition count so that the detection value is acquired from the acceleration sensor the number of times corresponding to the set acquisition count during one rotation of the wheel assembly.

2. The acceleration detecting device according to claim 1, wherein the circuitry is further configured to compare at least two detection values that are acquired consecutively, and detect that the acceleration detecting device is located at a predetermined specific angle from change in fluctuation of the detection values.

3. The acceleration detecting device according to claim 2, wherein the circuitry is further configured to determine that the acceleration detecting device has passed a lowest position or a highest position in the wheel assembly when the change in fluctuation of the detection value switches from increasing to decreasing or from decreasing to increasing.

4. The acceleration detecting device according to claim 1, wherein
the acceleration detecting device is attached to a back face of a tread portion of a tire, and
the circuitry is further configured to determine that a section of the tread portion in which the acceleration sensor is located has contacted the ground when the detection value of the acceleration sensor has changed from a value greater than or equal to a predetermined ground contact determination threshold to a value less than the ground contact determination threshold.

5. The acceleration detecting device according to claim 1, wherein the circuitry is further configured to determine whether the rotation period is longer than or equal to a threshold, and set the acquisition count to a greater value when the rotation period is longer than or equal to the threshold than when the rotation period is less than the threshold.

* * * * *